United States Patent [19]

Blackie

[11] Patent Number: 4,768,028

[45] Date of Patent: Aug. 30, 1988

[54] DISPLAY CONTROL APPARATUS HAVING A CURSOR

[75] Inventor: Ian T. B. Blackie, Edinburgh, Scotland

[73] Assignee: Ferranti plc, Cheshire, England

[21] Appl. No.: 845,578

[22] Filed: Mar. 28, 1986

[30] Foreign Application Priority Data

Mar. 29, 1985 [GB] United Kingdom ............ 8508327

[51] Int. Cl.$^4$ ............................................. G09G 1/00
[52] U.S. Cl. ..................................... 340/705; 340/706; 340/709
[58] Field of Search ............... 340/705, 706, 709, 980, 340/825.19; 358/102, 103, 250; 350/174

[56] References Cited

U.S. PATENT DOCUMENTS

| | | | |
|---|---|---|---|
| 4,349,815 | 9/1982 | Spooner | 340/705 |
| 4,439,755 | 3/1984 | LaRussa | 340/705 |
| 4,565,999 | 1/1986 | King et al. | 340/706 |
| 4,682,159 | 7/1987 | Davison | 340/825.19 |
| 4,688,037 | 8/1987 | Krieg | 340/825.72 |

FOREIGN PATENT DOCUMENTS

| | | |
|---|---|---|
| 0139433 | 8/1984 | Japan ........................ 340/709 |
| 1259457 | 1/1972 | United Kingdom . |
| 1489758 | 10/1977 | United Kingdom . |
| 1557511 | 12/1979 | United Kingdom . |
| 1578136 | 11/1980 | United Kingdom . |
| 2117609 | 10/1983 | United Kingdom . |

OTHER PUBLICATIONS

"Eye-ball Control", by Dan Boyle; Interavia, vol. 34, Sep. 1979.

Primary Examiner—Gerald L. Brigance
Assistant Examiner—Jeffery A. Brier
Attorney, Agent, or Firm—Kerkam, Stowell, Kondracki & Clarke

[57] ABSTRACT

The apparatus includes alignment means (13, 14) for determining the direction of a sight-line (12) extending from an observer (11) to a display surface (10), projection means (15, 16) for projecting an image of a graticule into the sight-line for movement therewith, and control means (17) operable to cause the display of a movable cursor on the display surface (10) when the sight-line (12) intersects the display surface.

17 Claims, 2 Drawing Sheets

DISPLAY CONTROL APPARATUS HAVING A CURSOR

This invention relates to display control apparatus and in particular to such apparatus whereby the information shown on the display may be varied by an observer of the display.

Operator control of a display is a common feature, particularly in situations where the display is computer controlled. Manipulation may be effected using a joystick or tracker ball or, in the case of a cathode-ray tube display, by a light pen. These devices are usually arranged to move a cursor on the display to a desired position to enable the displayed information to be changed in a required manner.

A problem clearly arises in situations where the observer either cannot reach the display surface to use a light pen or has his hands already occupied and is unable to use a joystick or tracker ball.

It is an object of the invention to provide display control apparatus in which the information displayed may be varied with little or no physical intervention by an observer.

According to the present invention there is provided display control apparatus which includes alignment means for determining the direction of a sight-line extending from an observer to a display surface, projection means for introducing an image of a graticule into the sight-line for movement therewith, and control means operable to cause the display of a movable cursor on the display surface when the sight-line intersects the display surface.

The invention will now be described with reference to the accompanying drawings, in which.

Figure 1:
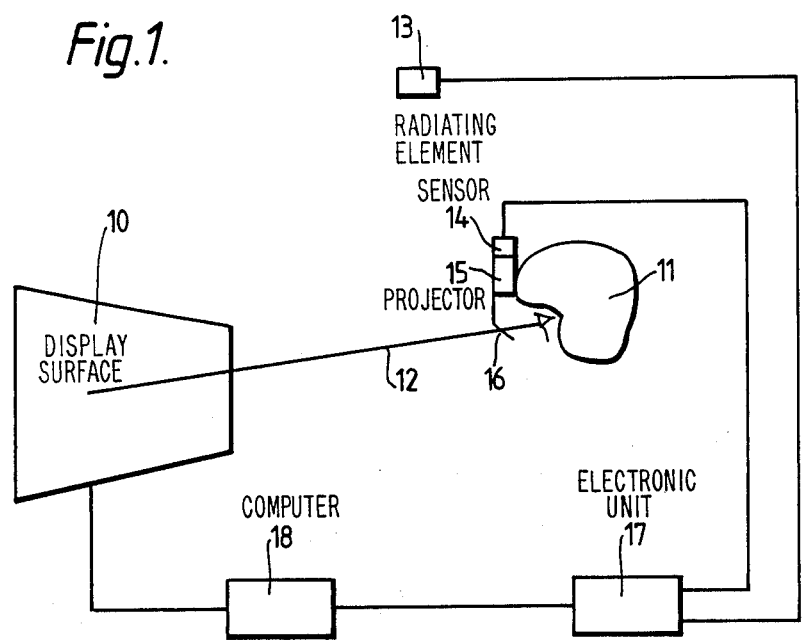
FIG. 1 is a schematic diagram of apparatus according to a first embodiment of the invention.

Referring now to FIG. 1, this shows a display surface 10, such as the screen of a cathode-ray tube display. Also shown in a helmet 11 to be worn by an observer. A three-axis alignment system is provided for defining the direction of a sight-line 12 extending from the observer. The alignment system may, by way of example, comprise a radiating element 13 fixed in position relative to the display surface 10 and a sensor element 14 fixed to the helmet 11. The helmet also carries projection means 15 which, by the use of a partially-reflecting element 16 projects an image of a graticule onto the sight-line 12.

The fixed radiating element 13 and sensor 14 are connected to an electronics unit 17 which is in turn connected to a computer 18 controlling the display produced on the display surface 10.

One simple form of alignment means comprises a radiator 13 which generates an alternating magnetic field adjacent to the helmet. The sensor 14 then comprises three or more coils which sense the components of the field. From the relative magnitudes of these components the electronics unit 17 determines the direction relative to the electric field of the sight-line 12 from the helmet.

Figure 2:
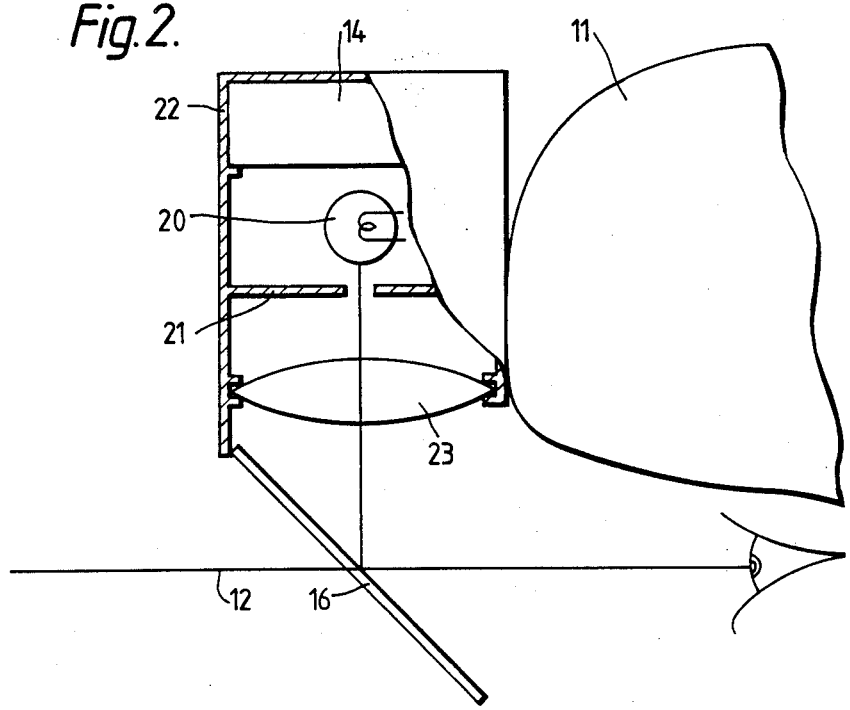
FIG. 2 shows detail of the projection means of FIG. 1.

FIG. 2 shows the graticule projector in greater detail. A lamp 20 is located adjacent to the graticule 21 in a housing 22 which contains a lens 23 arranged for focus the image of the graticule at a suitable point. Light passing through the lens 23 passes onto the semi-reflecting element 16 which, like the housing 22, is fixed relative to the helmet 11. The element 16 projects the image of the graticule 21 into the eye of an observer wearing the helmet so that the graticule appears to be focussed at a predetermined distance from the observer's eye along the sight-line 12.

If the graticule is to be used only to modify the display, then the image may be focussed at a distance equal to that of the display from the observer's eye. However, such a graticule is frequently used for observations of other things than the display, in which case it may be focussed at infinity.

Figure 3:
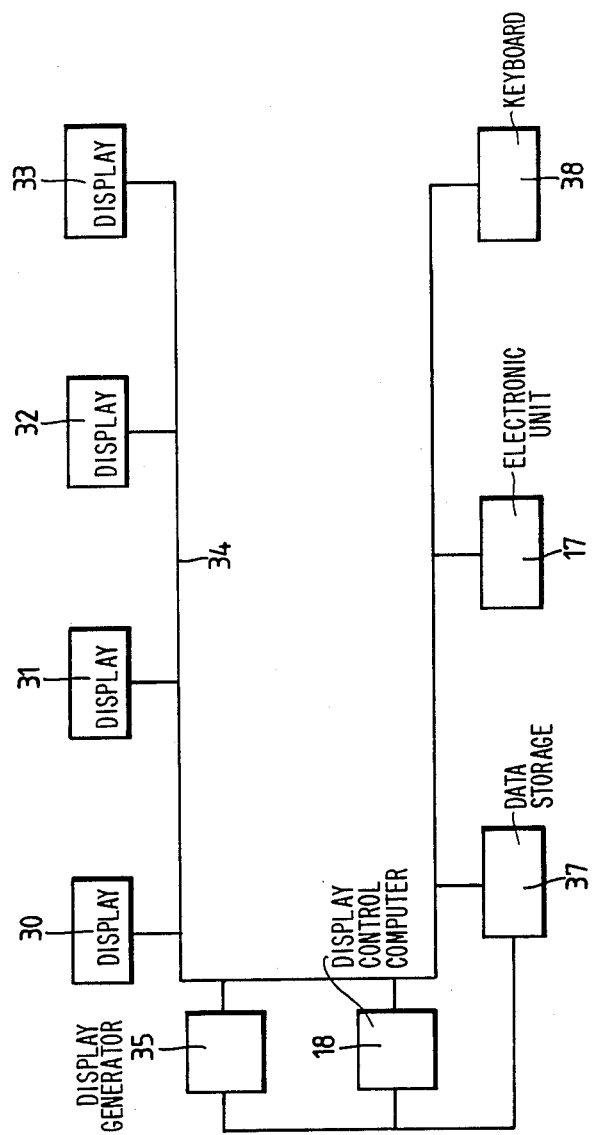
FIG. 3 illustrates one interconnection arrangement of the apparatus.

FIG. 3 shows how the various units of the display control may be connected to the display circuity itself. The drawing shows a number of displays 30–33, rather than the single display shown in FIG. 1. The displays are connected to data highway 34 to which are also connected to the display generator 35 and the display control computer 18. A data store 37 is also connected to the highway 34 and to computer 18 and display generator 35. Also connected to the data highway is the electronics unit 17 of the display control apparatus and an input device such as a keyboard 38.

In operation the electronics unit 17 is operating continuously to determine the direction of a sight-line from the helmet 11 by comprising the outputs of the sensor 14. This direction is applied to the computer 18 which determines when the sight-line intersects the display surface 10. If such intersection occurs, then a cursor is displayed on the display surface at or near to the point of intersection. Conveniently, and to avoid observer confusion, the graticule image may be removed from the observer's view, since the observer is now able to move the cursor over the display surface by appropriate head movements. It is probable that the cursor will be used to cause a menu-stored in the data store 37 to be displayed on the screen. A control function shown on the menu may be activated either by the observer using a simple control such as a button or switch or, for example, by maintaining the cursor in the appropriate position on the menu for a predetermined time.

If the sight-line moves away from the display surface then the cursor will be extinguished and the graticule image returned.

All that the computer 18 requires to control the cursor is data defining the boundaries of the display surface in the space frame defined by the radiating element 13. A number of separate display surfaces controlled by the same computer may be provided rather than a single surface.

The use of the computer 18 to control the movement of the cursor and control of the displayed information is conventional and need not be described further.

If the display control system is to be used in one of the most likely situations, namely in an aircraft cockpit, then it is probable that the graticule image will also be used as a marker for controlling or sighting functions outside the aircraft. In such a situation the graticule image may be switched off whenever the sight-line indicates that the pilot is looking at instruments inside the cockpit rather than at the outside view. This will prevent the graticule image from interferring with the instrument being observed. All that is necessary is to define in coordinate terms the boundary line or lines between the panel and the windscreen.

If the graticule image is being used for both internal and external purposes it may be preferable to provide two graticule projectors providing images focussed at different distances. Again, the computer or the electronics unit may perform the selection function depending upon the direction of the sight-line.

Other forms of alignment means may be used than that described above. Commonly-used systems employ infra-red or visible light for determining helmet position and orientation. Other forms of alignment means may also be used.

The display control apparatus may be used with any form of interactive computer-driven display. Displays of this type are being used increasingly, and thus no attempt will be made to define or limit the applications of the apparatus. In its simplest form the invention may be applied to any display system with which a light pen, joystick, tracker ball or other interactive device could be used. In many situations the projection means and alignment means need not be carried on a helmet as described, but may be supported by a much lighter mounting such as a spectacle frame or the like.

What we claim is:

1. Display control apparatus which includes alignment means for determining the direction of a sight-line extending from observer to a display surface, projection means for introducing an image of a graticule into the sight-line for movement therewith, and control means responsive to said alignment means and operable to cause a movable cursor to be displayed and positioned on the display surface at the intersection of the sight-line and the display surface and to remove the image of the graticule when the cursor is displayed whereby said control means causes the display of said movable cursor on said display surface when said alignment means determines that the observer's line of sight intersects said display surface.

2. Apparatus as claimed in claim 1 in which the alignment means includes a radiating element fixed relative to the display surface and a sensor element fixed relative to the projection means.

3. Apparatus as claimed in claim 2 in which the radiating element is operable to radiate an electro-magnetic field throughtout a volume containing the sensor element.

4. Apparatus as claimed in claim 2 in which the sensor element and the projection means are attached to mounting means arranged to be carried on the observer's head.

5. Apparatus as claimed in claim 4 in which the mounting means comprises a helmet.

6. Apparatus as claimed in claim 1 in which the projection means includes a light source for illuminating a graticule, focussing means for focussing an image of the graticule at a predetermined distance from the observer, and a partially reflecting surface for introducing the image of the graticule into the sight-line.

7. Apparatus as claimed in claim 1 which includes second projection means operable to introduce a second graticule image into the sight-line, the two images being focussed at different distances along the sight-line.

8. Apparatus as claimed in claim 1 in which the control means includes means for generating signals which identify the point of intersection of the sight-line with the display surface.

9. A display control apparatus for an observer comprising:
    (a) mounting means simultaneously movable with a line sight of the observer;
    (b) a display surface;
    (c) alignment means for determining the direction of said line of sight of the observer;
    (d) a first projection means disposed on said mounting means for introducing a first image of a graticule into said line of sight of the observer; and
    (e) control means responsive to said alignment means and for causing the display of a movable cursor on said display surface substantially at the intersection of said display surface and said line of sight of the observer and also for removing said first image of a graticule when said cursor is displayed whereby said control means causes the display of said movable cursor on said display surface when said alignment means determines that the observer's line of sight intersects said display surface.

10. The display control apparatus according to claim 9, wherein the mounting means is adapted to be carried on the observer's head.

11. The display control apparatus according to claim 9, wherein said alignment means further comprises a radiating element fixed relative to said display surface.

12. The display control apparatus according to claim 11, further comprising a sensor element fixed relative to said projection means.

13. The display control apparatus according to claim 12, wherein said radiating element radiates an electromagnetic field throughout a volume of space containing said sensor element.

14. The display control apparatus according to claim 9, wherein the mounting means comprises a helmet.

15. The display control apparatus according to claim 9, wherein said first projection means includes a light source for illuminating said first image of a graticule, focussing means for focussing said first image of a graticule at a predetermined distance from the observer, and a partially-reflecting surface for introducing said first image of a graticule into said line of sight of the observer.

16. The display control apparatus according to claim 9 further comprising a second projection means for introducing a second image of a graticule into said line of sight of the observer, said first image of a graticule being adapted to focus at a different distance from the observer along said line of sight from said second image of a graticule.

17. A display control apparatus according to claim 9, wherein said control means includes generating means for generating signals which identify said intersection of said display surface and said line of sight of the observer.

* * * * *